United States Patent
Yanai et al.

(10) Patent No.: US 10,944,095 B2
(45) Date of Patent: Mar. 9, 2021

(54) ROLL-PRESS APPARATUS

(71) Applicant: ONO ROLL CO., LTD., Hitachiomiya (JP)

(72) Inventors: Katsuhiko Yanai, Hitachiomiya (JP); Shigeru Mori, Hitachi (JP)

(73) Assignee: Oono-Roll Corporation, Ibaraki (JP)

( * ) Notice: Subject to any disclaimer, the term of this patent is extended or adjusted under 35 U.S.C. 154(b) by 139 days.

(21) Appl. No.: 16/305,799

(22) PCT Filed: Feb. 27, 2018

(86) PCT No.: PCT/JP2018/007118
§ 371 (c)(1),
(2) Date: Nov. 29, 2018

(87) PCT Pub. No.: WO2018/168434
PCT Pub. Date: Sep. 20, 2018

(65) Prior Publication Data
US 2020/0194772 A1  Jun. 18, 2020

(30) Foreign Application Priority Data
Mar. 14, 2017  (JP) .............................. JP2017-048053

(51) Int. Cl.
*B23P 19/00*  (2006.01)
*H01M 4/04*  (2006.01)

(52) U.S. Cl.
CPC ..... *H01M 4/0435* (2013.01); *Y10T 29/53204* (2015.01)

(58) Field of Classification Search
CPC ......... H01M 4/0435; H01M 4/04; B21B 1/40; B21B 53/00; B21B 3/00; B21B 3/02; Y10T 29/49126; Y10T 29/49204; Y10T 29/59204

USPC ........................................... 29/830, 874, 746
See application file for complete search history.

(56) References Cited

U.S. PATENT DOCUMENTS

| | | | | |
|---|---|---|---|---|
| 6,284,405 B2 * | 9/2001 | Kaido | ..................... | H01M 4/04 29/623.5 |
| 2015/0360268 A1 * | 12/2015 | Zhou | ................... | H01M 4/0435 72/252.5 |

FOREIGN PATENT DOCUMENTS

| | | | |
|---|---|---|---|
| JP | 2000-140907 A | | 5/2000 |
| JP | 2008-226502 A | | 9/2008 |
| JP | 2012-064563 A | | 3/2012 |
| JP | 2012-079592 A | | 4/2012 |
| JP | 2012079592 A | * | 4/2012 |

(Continued)

OTHER PUBLICATIONS

International Search Report and Written Opinion from International Application No. PCT/JP2018/007118 dated Apr. 24, 2018.

*Primary Examiner* — Donghai D Nguyen
(74) *Attorney, Agent, or Firm* — Daniel J. Stanger

(57) ABSTRACT

In a wrinkling prevention device, a work roll having a diameter smaller than that of a press-roll is pressed against the press-roll, and the work roll is supported by a bearing frame through a backup. With this configuration, an uncoated part can be elongated with a uniform pressing force. Further, an edge roller is disposed at an end part of the bearing frame which supports the work roll, and the edge roller is brought into contact with the other press-rolls not in contact with the work roll so that the axis parallelism of the work roll with the press-roll can be ensured.

10 Claims, 11 Drawing Sheets

(56) References Cited

FOREIGN PATENT DOCUMENTS

| JP | 2012-129147 A | 7/2012 |
|----|---------------|--------|
| JP | 2014-220113 A | 11/2014 |

\* cited by examiner (A)

(B)

ROLL-PRESS APPARATUS

TECHNICAL FIELD

The present invention relates to a wrinkling prevention device provided on a roll-press apparatus for pressing an electrode plate coated with plural stripes of active material.

BACKGROUND ART

Patent Literature 1 describes a press-roll apparatus for making length of coated portion and length of uncoated portion equal after roll-pressing, wherein a processing-roll for elongating only the uncoated portion is disposed on entry side of the press-roll apparatus and the processing-roll is pressed against the uncoated portion, and concavo-convex steps formed on the surface of the processing-roll is transferred to the uncoated portion.

In Patent Literature 2, an electrode plate press apparatus is proposed. In the proposed apparatus, pressing rolls for roll-pressing an electrode plate are positioned stagger in the travelling direction of the electrode plate. Further, the pressing rolls of the proposed apparatus are divided to allow pressing only the coated portion. The Literature further describes such a feature that a guide roller capable of pressing only an uncoated portion is disposed between pressing rolls arranged stagger in the travelling direction of the electrode plate to prevent wrinkles from occurring in the uncoated portion.

Patent Literature 3 describes such a feature that, between guide rolls arranged at intervals in the travelling direction of an electrode material, the pressing roll is pressed against only uncoated portion of an electrode material, which portion is under tension, to elongate only the uncoated portion, the electrode material is then roll-pressed, and thereafter the uncoated portion is further elongated.

LITERATURES OF CONVENTIONAL ART

Patent Literatures

{Patent Literature 1}
  Japanese patent application laid-open No. 2012-79592
{Patent Literature 2}
  Japanese patent application laid-open No. 2008-226502
{Patent Literature 3}
  Japanese patent application laid-open No. 2014-220113

SUMMARY OF INVENTION

Technical Problem

Lithium ion batteries are made of a metal foil of aluminum or copper, the surface of which is coated with an active material such as metallic lithium that is capable of storing electrical energy. The active material is applied on the metal foil longitudinally in a form of a multiple stripes pattern. An electrode plate coated with active material in a form of multiple stripes has an uncoated part to be a connection terminal part when assembled into a battery. Since the electrode plate has a coated part and an uncoated part in the width direction, when the coated part and the uncoated part are simultaneously pressed with a pressing roll, the active material and metal foil only are sandwiched between pressing rolls to become thinner. In this process, the active material layer and the metal foil become stretched longer in the longitudinal direction. The uncoated part is however not sandwiched between pressing rolls, because the thickness of the uncoated part is thinner than that of the coated part. Therefore, the uncoated part does not stretch in the longitudinal direction. This means that the electrode plate comes to have two parts of different forms in its width direction. One part is a longer stripe form part elongated by stretching and the other is a not-elongated part having unchanged length. On the boundary between elongated coated part and not-elongated uncoated part, a wrinkle appears due to the difference of their elongations. The wrinkles thus occurred develops into deep wrinkles or cracks during the process of conveying and coiling, which may prevent normal conveyance and take-up coiling. Various methods have been proposed to solve this problem.

In the means described in Patent Literature 1, a dedicated processing roll for pressing the uncoated portion is employed. The dedicated processing roll has a concavo-convex step on its surface. The roll is pressed against the uncoated portion to elongate that portion by that convexo-concave step. In this method, because the thickness of the metal foil is as thin as 10 to 20 μm, it is necessary to make the size of the concavo-convex formed on the dedicated processing roll fine to prevent the metal foil from being holed or cracked. Further, to press the finely processed concavo-convex geometry with an upper and a lower processing rolls, the positions of the concave and the convex must accurately match, otherwise the upper and the lower concavo-convex may interfere each other. In a case even when forming a concavo-convex on a metal foil of 10 to 20 μm thick using a press apparatus dedicated to such thin foil, a highly accurate mold is still required. It is thought difficult to use a roll that needs a gap for a bearing or the like for holding the processing roll.

In the means described in Patent Literature 2, a guide roll for exclusive pressing the uncoated portion is disposed as in Patent Literature 1. For the purpose of generating a force to pull the electrode plate outward, it is proposed to arrange this guide roll at a slant angle of 0 degrees with respect to the moving direction of the electrode plate. That is, the left and right guide rolls independently have their rotation axis and are structured so as to press the metal foil. In this case, if there is a difference in pressing force between the right and left guide rolls, the electrode plate will bend due to the difference in elongation and meandering may occur because the metal foil is thin. In order to precisely control the speed and the pressing force of each of the right and the left separate guide rolls so that meandering or similar irregularity does not occur, it is necessary to provide a considerably complicated and expensive apparatus.

Patent Literature 3 discloses a method in which a tension is applied to an electrode plate, a pressing roll is pressed against only the uncoated portion of the electrode plate to give a different tension between the coated portion and the uncoated portion; and thereby the method expects plastic elongation to occur only at the uncoated portion. In this method, an attempt to elongate the uncoated portion by applying an increased tension may have a risk of occurrence of crack from the foil edge to result in breakage, because the thickness of the metal foil is as thin as 10 to 20 μm. Although an idea of incorporating a heating device and the like in the roll is described to help elongation of the uncoated portion, the travelling speed of the electrode plate is fast and it is therefore thought difficult to raise the temperature of the uncoated portion to the desired temperature.

The present invention has been made in consideration of the above problems. An object of the present invention is to provide a roll-press apparatus that roll-presses, with wrinkling suppressed using a simple mechanism, a long electrode plate made of a long very thin metal foil which is coated with one or more stripes of active material, wherein the occurrence of wrinkle is attributable to elongation difference resulted from roll-pressing applied to the coated part and the uncoated part. Another object of the present invention is to provide an electrode plate for lithium ion batteries produced using the invented roll-press apparatus.

Solution to Problem

The present invention proposes, in particular, a roll-press apparatus, comprising
a pair of upper and lower press-rolls for pressing an electrode plate in coil fed from a supply uncoiler to a take-up coiler,
wherein
the electrode plate has a coated part coated with an active material applied on a metal foil and an uncoated part not coated with the active material,
and
a wrinkling prevention means,
wherein
the wrinkling prevention means comprises
a work roll having a diameter smaller than the other press-rolls,
and
a work roll parallelism holding means for keeping the parallelism of the work roll with respect to the corresponding press-roll,
wherein
the work roll parallelism holding means comprises
a frame for holding the work roll,
and
a member which is provided on the frame and contacts at two points on the press-roll on a side where the work roll does not contact,
wherein
the pair of the upper and the lower press-rolls roll-press the coated part,
and
that the one press-roll in the paired two press-rolls and the small diameter work roll perform roll-pressing the uncoated part.
The present invention further proposes the roll-press apparatus according to the above-stated roll-press apparatus,
wherein
the frame comprises
a shaft bearing frame for supporting the work roll
and
a main frame for holding the shaft bearing,
wherein
the member that contacts with the press-roll at two points is arranged on the shaft bearing frame or the main frame.
The present invention still proposes another roll-press apparatus according to the above-stated roll-press apparatus,
wherein each of the members that severally contacts with the press-roll at two respective points comprises a roller, which is arranged so that each of the two rollers contacts both ends of the press-roll respectively.
The present invention furthermore proposes another roll-press apparatus according to the above-stated roll-press apparatus, wherein
a rotary shaft that engages with a housing of the roll-press apparatus is provided on the main frame,
and
the wrinkling prevention device is arranged in such a way that the roll center of the press-roll and the work roll and the center of the rotary shaft provided on the main frame are aligned on one straight line.
The present invention still more proposes another roll-press apparatus according to the above-stated roll-press apparatus,
wherein
the wrinkling prevention device is supported rotatably on the housing via a bearing that holds the rotary shaft,
wherein the roller installed so as to contact both ends of the press-roll rotates about the rotary shaft.
The present invention still further proposes another roll-press apparatus according to the above-stated roll-press apparatus,
wherein
the wrinkling prevention device has two backup rolls arranged in a V-formation so as to reinforce the work roll,
and
wherein the work roll has a part such that the diameter thereof to be in contact with the uncoated part is larger than the roll diameter of such a part that contacts the coated part.
In particular, the present invention proposes a roll-press apparatus, comprising
a pair of upper and lower press-rolls for pressing an electrode plate fed from a supply uncoiler to a take-up coiler,
wherein
the electrode plate has a coated part coated with an active material applied on a metal foil and an uncoated part not coated with the active material,
and
a wrinkling prevention means having a work roll having]
a diameter smaller than a diameter of the other press-rolls;
wherein
the wrinkling prevention means is arranged at the entrance side of the press-roll apparatus such that the pair of the upper and the lower press-rolls perform roll-pressing the coated part,
and
that one press-roll in the paired two press-rolls and the work roll performs roll-pressing the uncoated part to elongate,
wherein,
the uncoated part moves in a state of closely contacting with the outer periphery of the press-roll, at a speed synchronized with the rotational speed of the press-roll.
In concrete, the present invention proposes a method for roll-pressing an electrode plate using a roll-press apparatus having
a pair of the upper and the lower press-rolls,
wherein
the roll-press apparatus presses an electrode plate supplied from a supply uncoiler to a take-up coiler,
wherein
the electrode plate has a coated part coated with an activate material applied on a metal foil and an uncoated part not coated with the active material;
the roll-pressing method characterized in that the roll-press apparatus has
a work roll having a diameter smaller than a diameter of the other press rolls,
a backup roll to reinforce the work roll,
a work roll parallelism holding means for keeping the parallelism of the work roll with respect to the corresponding press-roll,
wherein
the work roll parallelism holding means comprises a frame to hold the work roll, a plurality of members provided on the frame, wherein each of which members contacts severally at two points on the press-roll on a side where the work roll does not contact; wherein an elongation difference between the coated part and the uncoated part is regulated by controlling the pressing force to be applied on the work roll.

The present invention further proposes a roll-pressing method as described above, characterized in that a measuring device is provided on the exit side of the paired press-rolls to measure distance from a reference point to the surface of the pressed electrode plate and difference between the elongation of coated part and the elongation of uncoated part is calculated based on the measurements obtained by the measuring device.

Advantageous Effect of the Invention

According to the present invention, the metal foil of the uncoated part is sandwiched between one press-roll and the work roll having a diameter smaller than that of the press-roll to give an elongation, and a metal foil of the coated part is pressed with a pair of large diameter press-rolls, thus it is possible to eliminate nonuniformity of elongation, and it is also possible to perform roll-pressing without wrinkling and waving. Furthermore, one press-roll, which is not in contact with the work roll, and an edge roll attached to the frame supporting the work roll are brought into contact with each other with a determinate force, thereby the axis parallelism between the work roll and the press-roll is always maintained. Thus, it is possible to make the elongation of the uncoated part constant in width direction of the electrode plate.

DESCRIPTION OF EMBODIMENTS

The following describes embodiments of the present invention referring to drawings.

Figure 1:
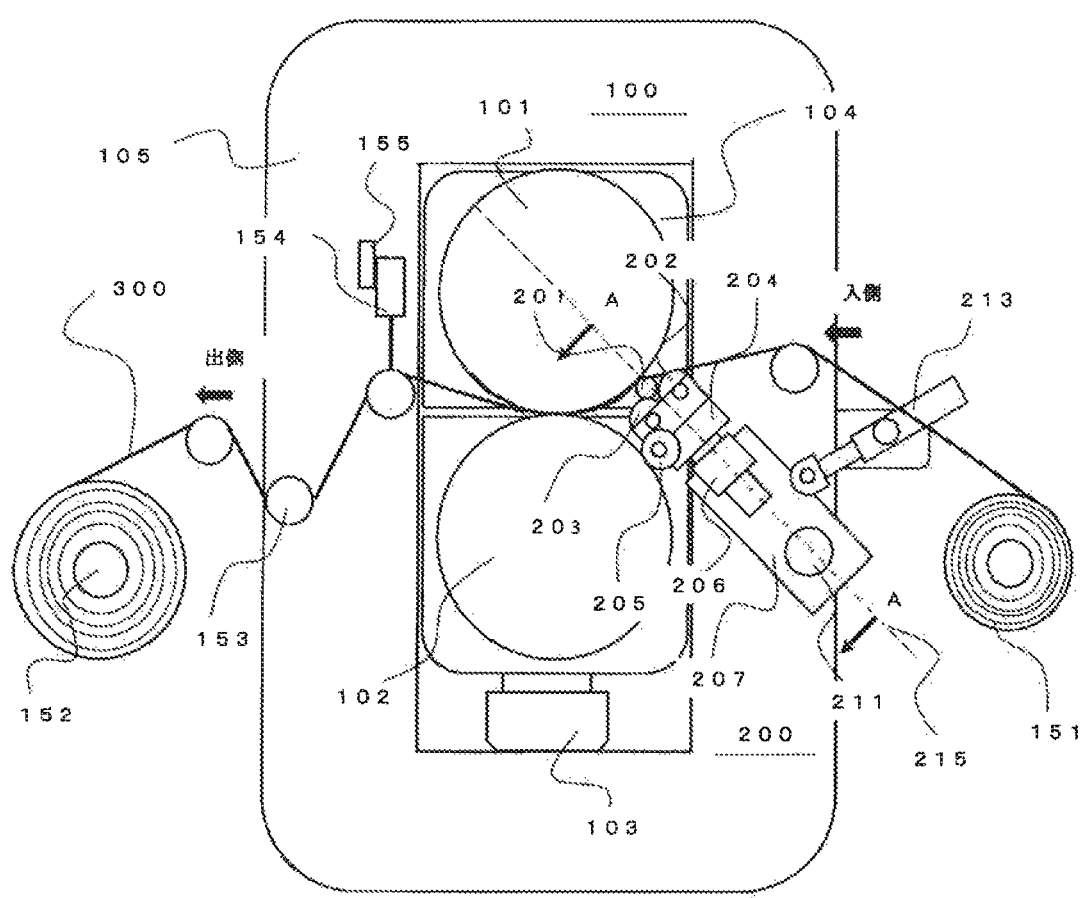
FIG. 1 A schematic diagram showing overall arrangement of a roll-press apparatus having a wrinkling prevention device.

FIG. 1 schematically shows an overall arrangement of a roll-press apparatus that is an embodiment of the present invention. On the entry side of a roll-press apparatus 100, a supply uncoiler 151 on which an electrode plate 300 for lithium battery wound in coil before pressing is loaded. On the exit side of the roll press apparatus 100, a take-up coiler 152 which winds the roll-pressed electrode plate 300 in a coil is provided. A determinate tension is applied on the electrode plate 300 between the supply uncoiler 151 and the roll-press apparatus 100, and between the roll-press apparatus 100 and the take-up device 152, so that irregularity such as tortuous does not occur during the electrode plate passing. A measuring device 154 to measure a distance is disposed on the exit side and a plurality of guide rollers 153 for conveying the electrode plate 300, wherein the distance meter is to measure the geometry of the electrode plate 300.

The roll press apparatus 100 has an upper press-roll 101 and a lower press-roll 102. The electrode plate 300 coated with an active material on the surface of the metal foil is sandwiched between the upper press-roll 101 and the lower press-roll 102, then pressed passing therethrough, thereby an active material is compressed. The roll press apparatus 100 is provided with a press down device 103 for controlling the pressing force between the upper press-roll 101 and the lower press-roll 102, and a bearing box 104 for holding the upper and lower press-rolls 101 and 102, and a housing 105 for bearing pressing force.

In this embodiment, a wrinkling prevention device 200 is provided on the entry side of the roll-press apparatus 100, wherein the wrinkling prevention device 200 contacts with the upper press-roll 101 to press the electrode plate 300. The details of the wrinkling prevention device 200 will be described later.

Figure 2:
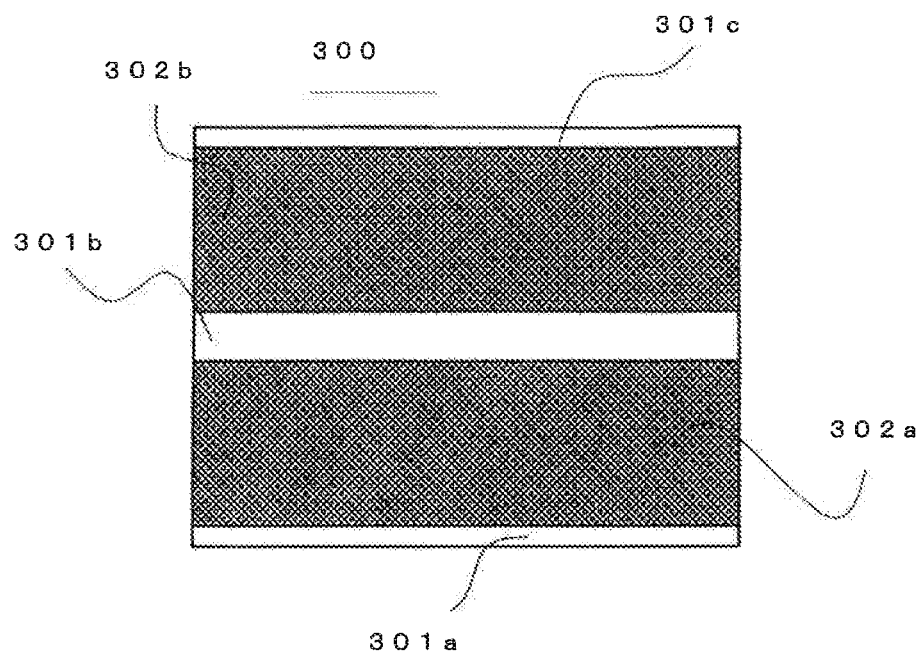
FIG. 2 A diagram showing an example of an electrode plate in which a plurality of active material streaks are applied in stripes.
Figure 2:
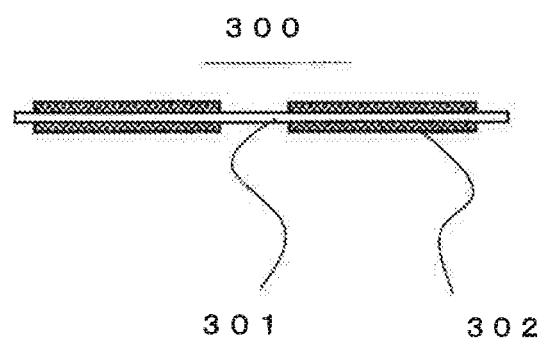

FIG. 2 shows an example of the electrode plate 300 on which the active material is coated in a two-line stripe form. FIG. 2(a) is a plan view of the electrode plate 300, and FIG. 2(b) is a cross-sectional view of the same.

The electrode plate 300 shown is an electrode plate for use of lithium ion batteries as an example, wherein a plurality of streaks of active material 302a and 302b are applied in a stripe form on the surface of a belt-shaped metal foil 301 (aluminum foil, copper foil, etc.). Because the uncoated part 301 comes to be an energizing terminal part in the process of assembling into a battery, the active material 302 is not coated and the metal foil 301 is exposed. When the number of the stripes of the active material 302 is two, the uncoated parts of the electrode plate 300 are edges 301a and 301c, and a central part 301b. In the cross-sectional view of the electrode plate 300 shown in FIG. 2(b), although the thickness is illustrated exaggeratedly, the actual thickness of the metal foil 301 is about 10 to 20 μm. The overall thickness of the coated part before pressing including active material of the upper and lower layers and the metal foil 301 is about 200 to 250 μm; after pressing, the overall thickness will be around 100 to 140 μm.

Figure 3:
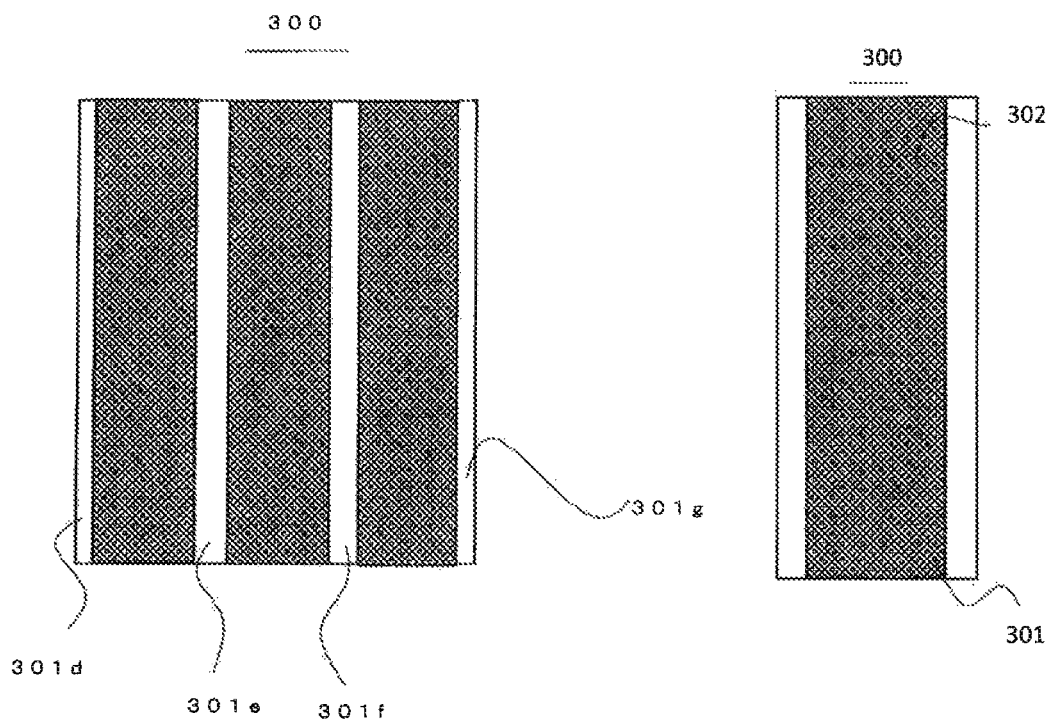
FIG. 3 A view showing another example of an electrode plate in which an active material is applied in a stripe form.

FIG. 3 shows another example of the electrode plate having an active material applied in a stripe form.

Figure 11:
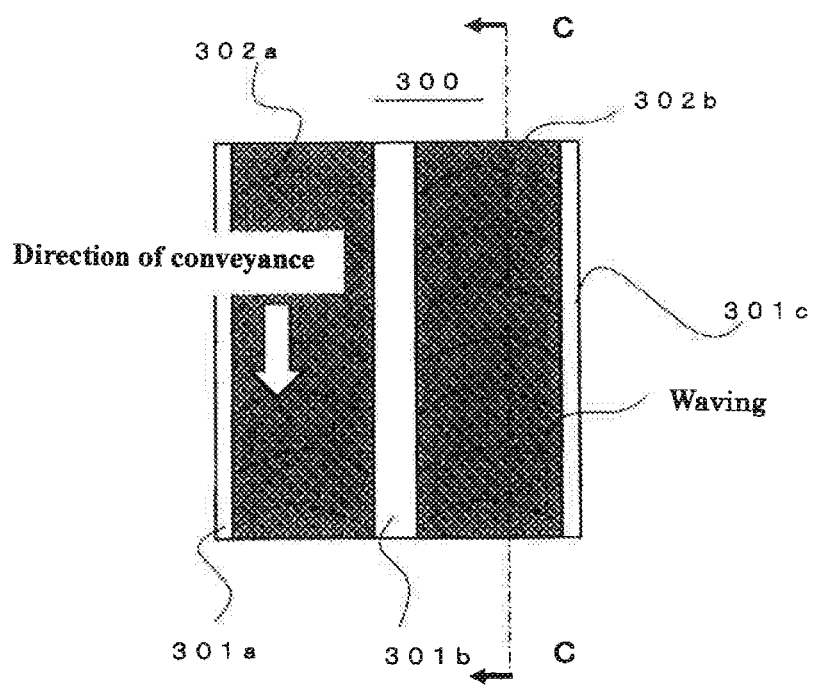
FIG. 11 A schematic diagram of a plan view of a state of the electrode plate having an elongation difference between a coated part and an uncoated part.
Figure 12:
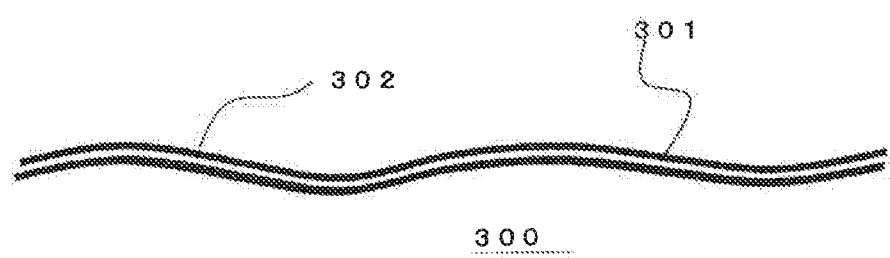
FIG. 12 A cross-sectional view taken along the line C-C of FIG. 11.

When the electrode plate 300 having a coated part and an uncoated part is compressed with the upper and lower press-rolls 101 and 102, as stated in the section Technical Problem, a pressing load is imposed concentratedly on the coated parts 302a and 302b of the metal foil 301 coated with the active material, causing elongation of the metal foil 301 only the part under the coated part, thus, the uncoated parts are not elongated. This means that wrinkles or waves appear on the electrode plate 300 in its width direction due to the elongation difference caused from the roll pressing. Particularly, these wrinkles develop to a cause of break or faulty-coiling in coiling the electrode plate 300 with a take-up device 152. The waving gives a bad influence to conveyance of the electrode plate 300. FIG. 11 schematically shows the planar state of the electrode plate 300 resulted from the elongation difference between the coated part and the uncoated part. FIG. 12 is a cross-sectional view of the electrode plate 300 under that situation taken along the line C-C.

In the present embodiment, providing the wrinkling prevention device 200 described below in the roll-press apparatus 100 eliminates occurrence of elongation difference between the coated part and the uncoated part by stretching the uncoated part 301 and enables wrinkling and waving not to occur.

Main constituent elements of the wrinkling prevention device 200 of the present embodiment will be described referring to FIGS. 1 and 8, using an example in which the electrode plate 300 coated with two stripes of the active material 302 is pressed.

The main constituent elements include a work roll 201 that presses the uncoated part 301 of the electrode plate 300 against the upper press-roll 101 to elongate, a backup roll 202 to support the work roll 201 from back side to prevent bending of the work roll 201 caused by pressing force, a bearing 203 to support the backup roll 202, a bearing frame 204 to support the bearing 203, and an edge roller 205 that supports the bearing frame 204 so that the axis parallelism of axes of the work roll 201 with the upper press-roll 101 is always maintained. Further includes a hydraulic cylinder 206 that imposes a determinate pressing pressure via the work roll 201 onto the electrode plate 300 pinched with the work roll 201 and the upper press-roll 101, and a main frame 207 that holds the hydraulic cylinder 206 and receives pressing force from the work roll 201 through the hydraulic cylinder 206. A sliding rod 208 and a linear motion bearing 209 are incorporated in the main frame 207 to allow the bearing frame 204 to slide vertically and smoothly correspondingly to the motion of the hydraulic cylinder 206.

In order to rotate the main frame 207, a rotary shaft 211 is attached to the right and left of the lower part of the main frame 207, and a rotatable bearing 212 is attached to the inner surface of the housing 105 so that the rotary shaft 211 can rotate without play. Further, a pushing cylinder 213 for rotating the main frame 207 is attached to the housing 105. When pulling out the upper and lower press-rolls 101 and 102 from the housing 105, the main frame 207 can be rotated around the rotary shaft 211 by the motion of the pushing cylinder 213 so as not to interfere the bearing box 104 and the wrinkling prevention device 200 each other. A hydraulic system 218 for supplying pressing force for the work roll 201 and a proportional solenoid pressure reducing valve 217 for controlling the pressing force are provided.

Figure 4:
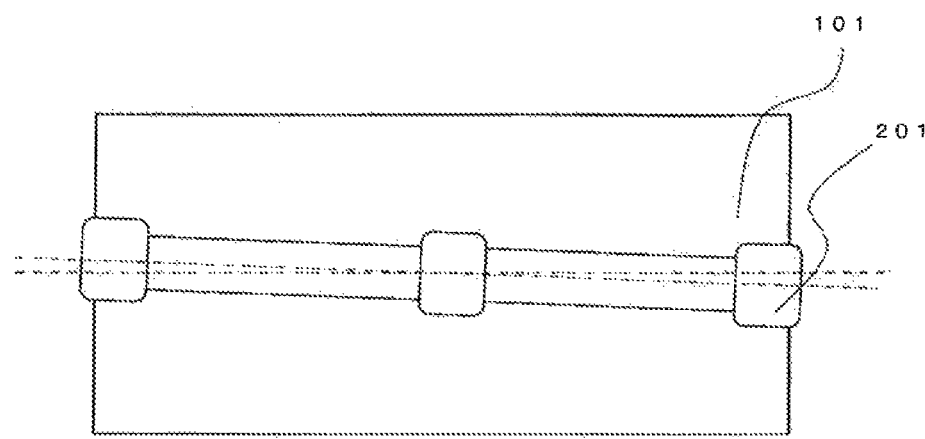
FIG. 4 A view showing a contact state of an upper pressing roll and a work roll having an inclination.
Figure 5:
FIG. 5 A diagram schematically showing a gap between rolls in the state of FIG. 4.

If the axis of the work roll 201 is skew with respect to the axis of the upper press-roll 101 as shown in FIG. 4, the distance between the axes of the work roll 201 and the upper press-roll 101 increases as the distance in the axial direction from the center increases as shown in FIG. 5. The hatched part in FIG. 5 schematically shows the variation of the axis to axis distance. If the electrode plate 300 is elongated with the axis of the work roll 201 being skew as shown in FIG. 4, different pressing forces will occur on the uncoated portions 301a, 301b, and 301c. Therefore, the uncoated part 301b in the central part elongates, but the distance between two rolls will be off at the uncoated parts 301a and 301c on the end. Thus, the pressing force decreases and it is accordingly not possible to elongate the thin metal foil 301 to an acceptable extent. Even the skew of axes between the work roll 201 and the upper press-roll 101 is minute, it comes difficult to make the elongation amount of the uncoated part 301 same at both ends and the center part of the electrode plate 300. To roll an extremely thin metal foil into a uniform thickness, it is important to accurately maintain, using the work roll 201 of small diameter, the axis parallelism between the two rolls that sandwiches the metal foil.

Figure 8:
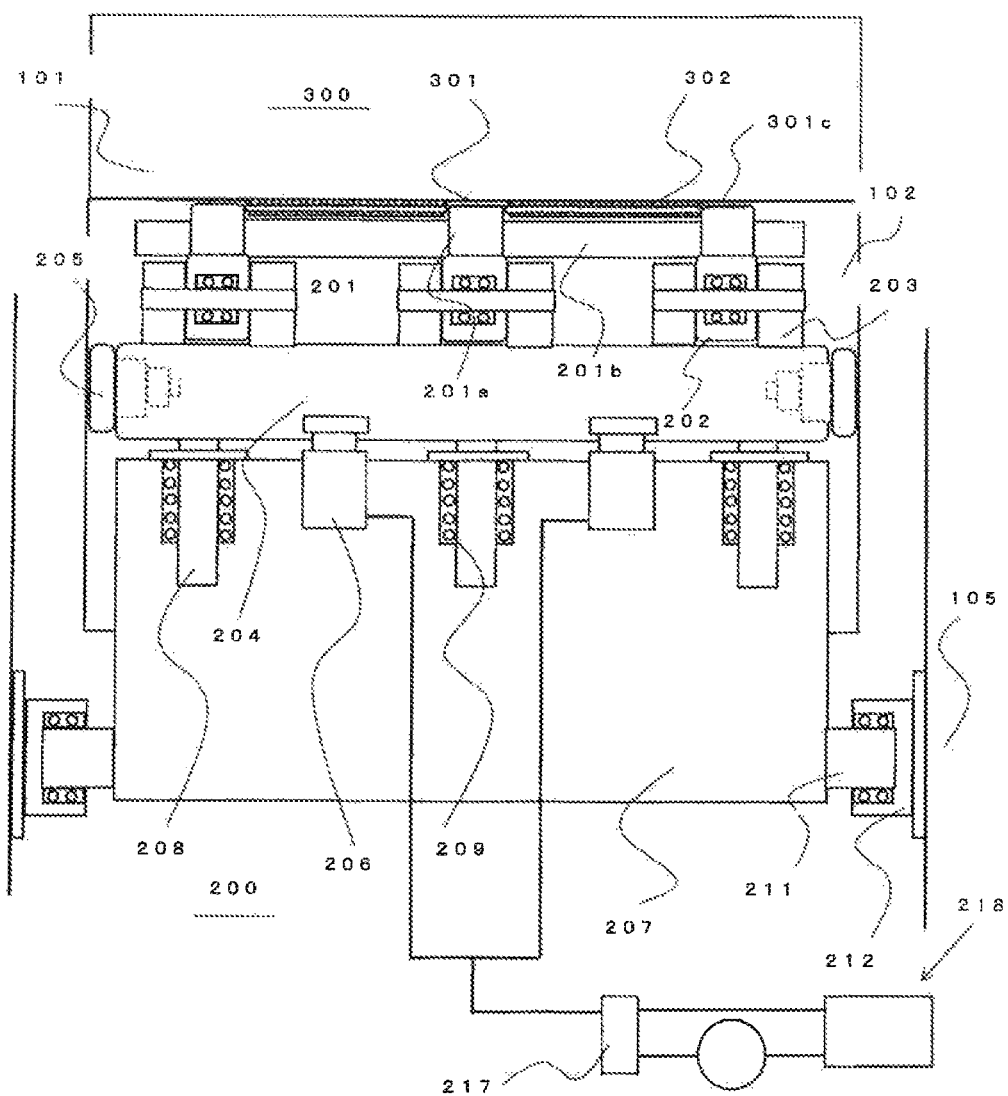
FIG. 8 A sectional view taken along the line A-A in FIG. 1 to show a state in which the electrode plate is sandwiched between the work roll and the upper pressing-roll.

In order to always ensure the axis parallelism between the work roll 201 and the upper press-roll 101, the edge rollers 205 attached to the vicinity of both end parts of the bearing frame 204 are brought into contact with the lower press-roll 102 which is not in contact with the work roll 201 as shown in FIGS. 1 and 8. As the shaft axis line connecting the two edge rollers 205 is processed to be in parallel with the axis of the bearing 203 that supports the backup roll 202, making the edge rollers 205 contact with the lower press-roll 102 assures the axis parallelism between the axis of the bearing 203 and the lower press-roll 102. Since the bearing 203 and the work roll 201 are assembled to be parallel, the axis parallelism of the lower press-roll 102 to the axis of the work roll 201 is assured. The axis parallelism between the work roll 201 and the upper press-roll 101 is always maintained, and a contact point 216 of the uncoated parts 301a, 301b, and 301c undergo the same pressing force, and the uncoated parts 301 are elongated to the same length, because the press down device 103 controls the upper press-roll 101 and the lower press-roll 102 so that they perform roll-pressing maintaining their parallelism. In order to make the edge rollers 205 arranged near the both end part of the bearing frame 204 always contact with the lower press-roll 102 with a determinate pressing force, the edge rollers 205 are thrusted around the rotary shaft 211 by the pushing cylinder 213 attached to the housing 105.

A structure, in which the edge roller 205 is attached to the bearing frame 204, is suitable for always assuring the axis parallelism between the work roll 201 and the upper press-roll 101. However, arranging the edge roller 205 on the main frame 207 also almost achieves a function for maintaining the axis parallelism between the work roll 201 and the upper press-roll 101. In addition, a reference point of thrusting by the edge roller 205 is not limited to the lower press-roll 102, a reference plane which is arranged on the bearing box 104 for holding the lower press-roll 102 in parallel to the axis of the lower press-roll 102 may be used as the reference position.

In the case where the edge roller 205 is disposed at a position closer to the center part of the bearing frame 204, the lower press-roller 102 comes into contact with the edge roller 205 within the area where the lower press-roll 102 elongates the electrode plate 300. The surface state of the contact area of the lower press-roll 102 which area is in contact with the edge roller 205 changes due to the difference of the face pressure, which invites a risk that a difference in gloss of the surface of the lower press-roll 102 may possibly be transferred to the surface of the electrode plate 300. This gloss change may lower the product quality of the electrode plate 300. In order to eliminate this concern, the edge roller 205 is disposed to contact with the lower press-roll 102 in the area closer to the end thereof where the electrode plate 300 is not pressed.

As FIG. 8 shows, in order not to elongate the coated part 302 of the electrode plate 300 even while the uncoated part 301 thereof is elongated by sandwiching with the upper press-roll 101 and a larger diameter part 201a of the work roll 201, it is necessary to make the work roll 201 have the larger diameter part 201a, which diameter is larger than the part that corresponds to the coated part 302, only at the part which contacts with the uncoated part 301. A part 201b which corresponds to the coated part is slightly smaller in diameter than the diameter of the part that contacts with the uncoated part 301. The backup rolls 202 arranged in V-formation contacts with the larger diameter part 201a of the work roll 201 and transfers the rolling load that works on the work roll 201 to the bearing frame 204 via bearing 203.

The bearing frame 204 is pushed up by the pressing force of the hydraulic cylinder 206, a pressurizing device, and one press-roll and the work roll elongates the metal foil 301 at the uncoated part thereof. The hydraulic cylinder 206 is arranged on the extension line of a center line 215 that connects centers of upper press-roll 101 and the work roll 201 so that the pressing force of the hydraulic cylinder 206 will be transferred efficiently between the upper press-roll 101 and the work roll 201. The center line 215 is a line that passes through the contact point 216 at which the upper press-roll 101 and the work roll 201 contacts, and also is a moving direction of the piston of the hydraulic cylinder 206.

At the lower part of the main frame 207, the rotary shaft 211 is arranged. A reaction force of the hydraulic cylinder 206 is transmitted to the main frame 207 and further transmitted from the bearing 212 to the housing 105 via the rotary shaft 211. Arranging the center of the rotary shaft 211 on the extension line of the center line 215 that connects the roll centers stated previously allows smooth transmission of the pressing force generated between the upper press-roll 101 and the work roll 201 to the housing 105.

In other words, the configuration is such that the center of the upper press-roll 101, and the contact point 216 between the upper press-roll 101 and the work roll 201, and the center of the rotary shaft 211 attached to the main frame 207, which supports the hydraulic cylinder 206, are disposed almost on one straight line.

The bearing frame 204 and the main frame 207 are separate things but connected with the sliding rod 208 and the linear motion bearing 209, thus the pressing force of the hydraulic cylinder 206 works on the center line 215. The pressing force, which occurs at the contact point 216 between the upper press-roll 101 and the work roll 201, can be made work as a reaction force on the rotary shaft 211 without causing a bending force between the bearing frame 204 and the main frame 207.

Figure 6:
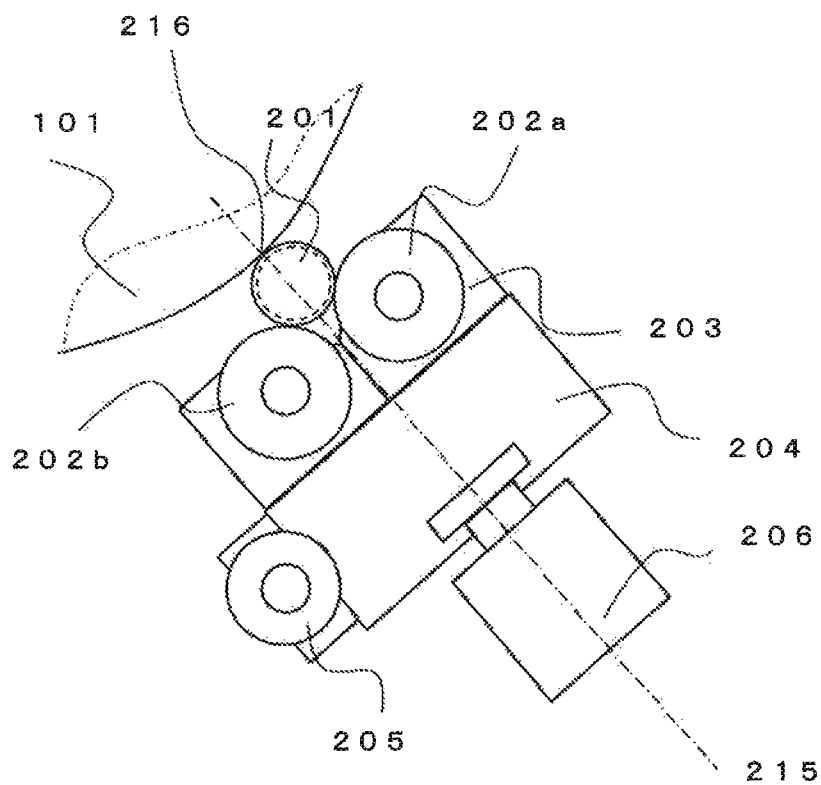
FIG. 6 A view showing an example of arrangement of a work roll and backup rolls of the wrinkling prevention device.

As FIG. 6 shows, the two backup rolls 202, which bear the pressing force come from the contact point 216 between the work roll 201 and the upper press-roll 101, are comprised of an upper backup roll 202a which reinforces from upper side and a lower backup roll 202b which reinforces from lower side; and when viewed from the side, these two backup rolls 202 are arranged in a V-formation. As shown in FIG. 8, the work roll 201 is held so as to be sandwiched from above and below by the backup rollers 202 arranged parallelly. Therefore, even if the uncoated part is discontinuous in the width direction of the work roll 201 and a discontinuous pressing force occurs on the work roll 201, a part thereof where a pressing force occurs is reinforced by the backup roll 202, thereby an accurate straightness without deflection can be maintained. Thus, a metal foil 301 having a very thin thickness can be safely and reliably elongated with a small pressing force and a significant effect can be obtained.

Figure 7:
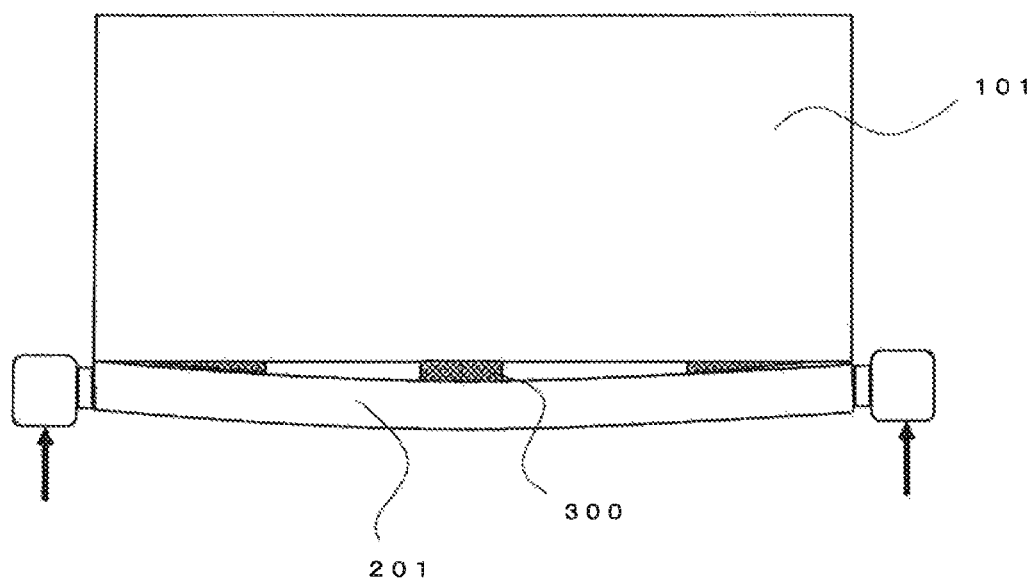
FIG. 7 A view showing deflection of the work roll of the wrinkling prevention device.

FIG. 7 is a view showing deflection of the work roll 201 of the wrinkling prevention device 200.

If the backup roll 202 is not provided and the pressing force is applied with the both ends of the work roll 201 held in bearing boxes, elongating the uncoated parts in even length is not possible due to deflection of the work roll 201 shown in FIG. 7, because different roll gap occurs in the uncoated parts 301a, 301b, and 301c of the electrode plate 300 shown in FIG. 2. To elongate the discontinuous uncoated part in even length, it is very important to maintain the straightness always correct without causing deflection of the work roll 201. Providing the backup roll 202 in a V-formation for supporting the work roll 201 makes this possible.

Next, the arrangement of the wrinkling prevention device 200 will be explained referring to FIG. 1. It is preferable that the wrinkling prevention device 200 be disposed on the entry side before the pressing point where the upper and lower press-rolls 101 and 102 are in contact. The electrode plate 300 passed through the guide roller 153 on the entry side is pressed against the upper press-roll 101 by the work roll 201, and, further, the uncoated part 301 is pressed by the work roll 201 and the upper press-roll 101. The pressed uncoated part 301 elongates and wrinkles occur. The coated part is also together pressed against the surface of the upper press-roll 101, and is brought into close contact with the outer periphery of the upper press-roll 101. Since the width of the coated part is much wider than that of the uncoated part, the electrode plate 300 moves to the press point at a speed synchronized with the rotational speed of the upper press-roll 101 while closely adhering to the surface of the upper press-roll 101.

Even if only the uncoated part is elongated with the work roll 201 causing wrinkling, the coated part comes into close contact with the outer periphery of the upper press-roll 101, and irregularity such as meandering does not occur, thus stable conveyance becomes achievable. After the uncoated part is elongated by the work roll 201, the electrode plate 300 is fed to the press point as the upper press-roll 101 rotates, and only the coated part is sandwiched between the upper and lower press-rolls and pressed. With this pressing process, the metal foil 301 of the coated part is elongated to the same length as the uncoated part, and wrinkles occurred in the uncoated part disappear. These workings are the function of the wrinkling prevention device 200. Since the axes parallelism between the work roll 201 and the upper press-roll 101 is always ensured by the edge roller 205, occurrence of irregularity such as twisting can be prevented when the electrode plate 300 travels along the upper press-roll 101. If the axis of the work roll 201 moves, an elongation difference in the uncoated part appears caused by the pressing of the work roll 201, which also causes meandering. By firmly holding the position of the work roll 201 with the edge roller 205, stable electrode plate passing comes practicable.

When the wrinkling prevention device 200 is located at the exit side of the pressing point, the coated part of the electrode plate 300 is first pinched with the upper and lower press-rolls to be elongated. Since the uncoated part does not contact with the pressing roll, that part does not elongate. Therefore, wrinkle or waving occurs on the coated part, disturbing its close contact with the upper press-roll 101; on the other hand, the uncoated part which has no elongation contacts with the upper roll-press 101. Accordingly, the range in which the electrode plate 300 and the press-roll 101 contacts closely comes to a narrow area of only the uncoated part. The electrode plate 300 is apt to meander in a moving area between the press point and the work roll 201 pressing point. To perform a stable press work, it is preferable to equip a wrinkling prevention device on the entry side of the pressing point.

In the explanation stated above, as shown in FIG. 1, the work roll 201, which is smaller in diameter, is pressed against the upper press-roll 101 at the entry side to elongate the uncoated part 301. In addition, a symmetrically contrary arrangement is also practicable, wherein pressing is performed sandwiching the uncoated part 301 between the lower press-roll 102 and the work roll 201, though not illustrated.

However, lithium batteries are extremely averse to mixing foreign matter in the manufacturing process. In the unlikely event that metal powder mixes while pressing work, the quality of the batteries, i.e., the finished products, will be seriously impaired. When a mechanism in which pressing with the lower press-roll 102 is employed, the work roll 201 and the backup roll 202 rotate always over the electrode plate 202 touching the upper face thereof. Further, in this mechanism, the hydraulic cylinder 206 for moving the bearing frame 204 vertically movable, and the sliding rod 208 for supporting the movable frame 204, and the linear motion bearing 209 all come to be arranged above the electrode plate 300. Therefore, as compared with a mechanism in which the upper press-roll 101 is pressed by the work roll 201 from below, there is a greater possibility that the foreign matter will peel off and fall on the upper surface of the electrode plate 300.

To reduce the possibility of adhering a foreign matter to the electrode plate 300, disposing the wrinkling prevention device 200 below the place where the electrode plate 300 passes is a preferable configuration as shown in FIG. 1.

Figure 9:
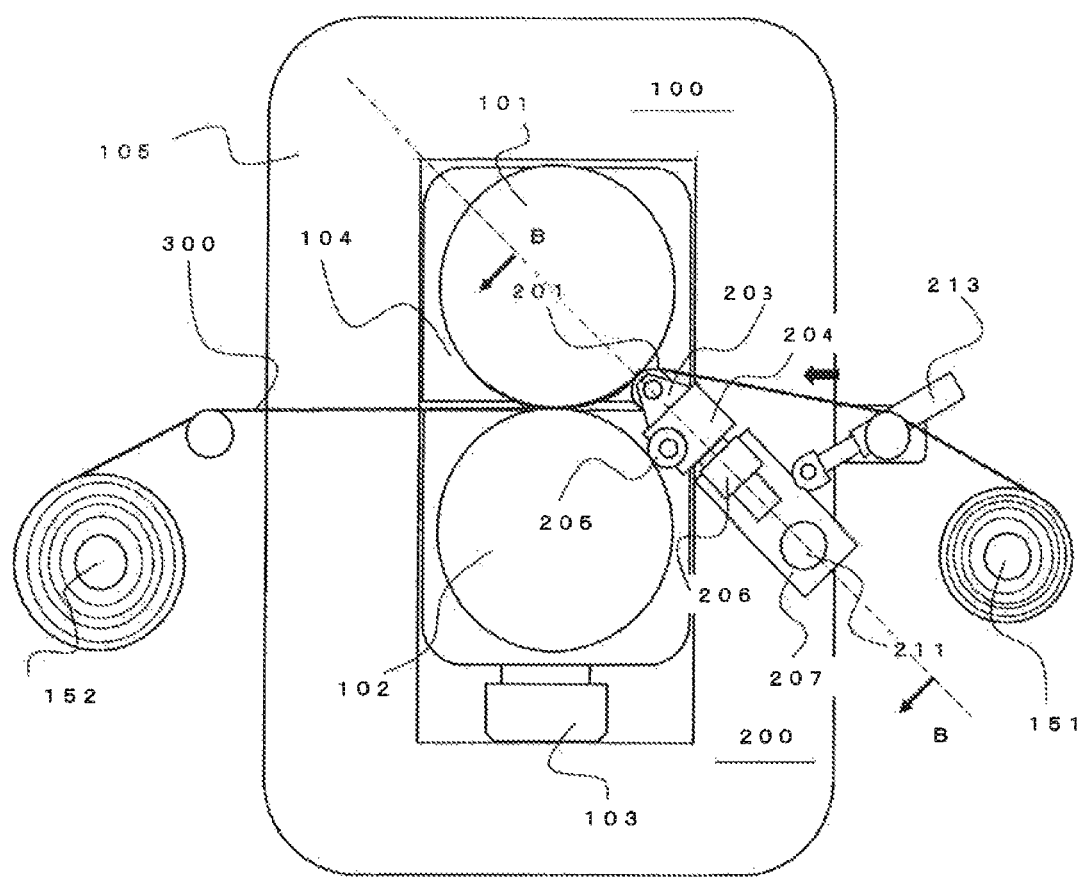
FIG. 9 A diagram showing an overall outline of another example of the roll-press apparatus which has the wrinkling prevention device.
Figure 10:
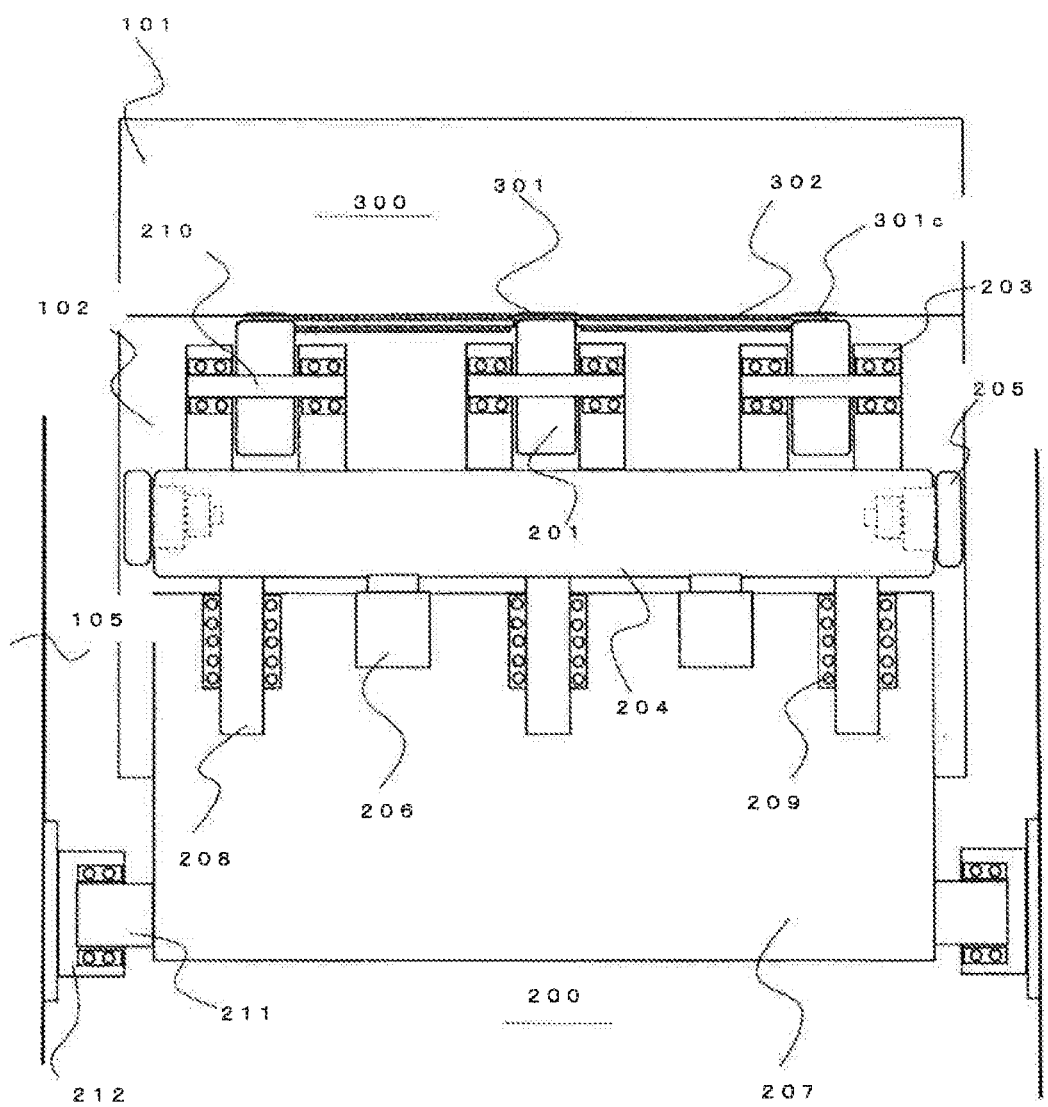
FIG. 10 A sectional view taken along the line B-B of FIG. 9, showing a state in which the electrode plate is sandwiched between the work roll and the upper press-roll.

As shown in FIG. 9, the work roll 201 having a short bearing shaft divided for rolling only the uncoated part 301 is configured to be supported by the left and right bearings 203. With this, it comes practicable to press with the deflection of the work roll 201 suppressed. The structure is such that the work roll 201 elongates one uncoated part 301, and a plurality of work rolls 201 are supported by a bearing frame 204. Therefore, the bearing shaft 210 comes thick. Accordingly, the diameter of the work roll 201 comes also thick compared with the method of holding the bearing shaft 210 with the two backup rolls 202 arranged in the V-formation configuration described above; this is a drawback. In a case, however, where the diameter of a press-roll 101 is small, even in a condition where the space for installing the wrinkling prevention device 200 is limited, the arranging of the wrinkling prevention device 200 comes practicable because the depth of the device can be made thin as the backup roll 202 is not provided, thus the arranging the device advantageously comes possible.

Even when the work roll 201 not having the backup roll 202 is supported directly by the bearing 203, the edge rollers 205 are attached to both ends of the bearing frame 204 in order to make the contact forces between the upper press-roll 101 and the plurality of work rolls 201 match. The contacting of the lower press-roll 102 with the edge roller 205 at a determinate contact force makes the parallelism between the upper press-roll 101 and the bearing frame 204 maintained.

The description in the above, a function was explained; that is the function prevents wrinkling or waving caused from elongation difference between the coated part and the uncoated part by elongating the uncoated part 301 pressing the smaller diameter of the work roll 201 against the upper press-roll 101. To prevent occurrence of the elongation difference on the electrode plate 300 in the roll-pressing, it is necessary to control the pressing force of the work roll 201 properly and to match the elongation amounts of the uncoated part 301 and of the coated part. A means for checking if these two elongations match will be described below, wherein a measuring device 154 for this purpose is disposed on the rear side of an upper and lower roll presses 101 and 102.

Figure 13:
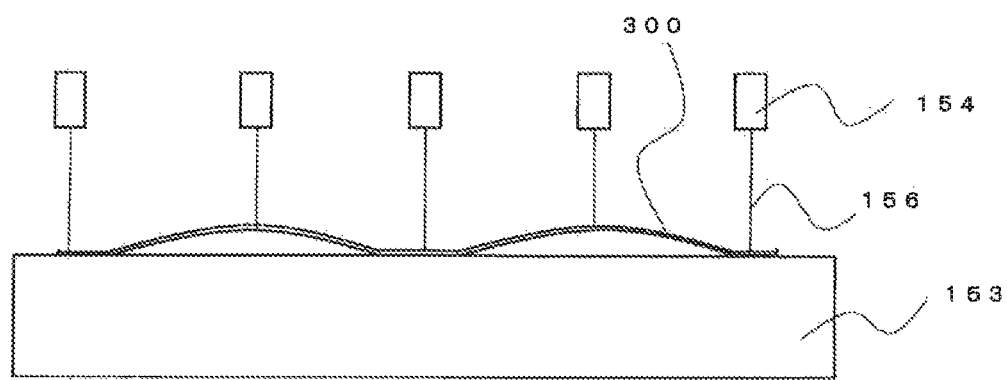
FIG. 13 A schematic view showing distance measurement from a reference point to the electrode plate surface using a measuring device.
Figure 14:
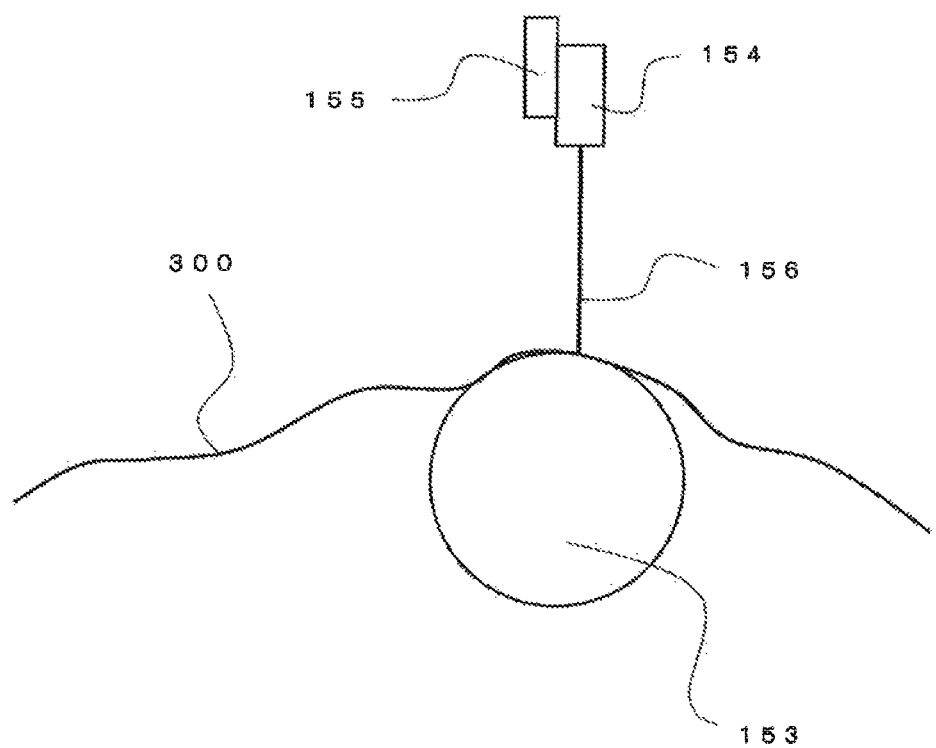
FIG. 14 A schematic view of FIG. 13 as seen from the side.

Referring to FIG. 1 and FIGS. 13 and 14, a first means capable of measuring with necessary accuracy with a simple measuring device will be described. The measuring device 154 is dispose and secured on a reference rail 155 fixed on the housing 105 at an upper side position of the guide roller 153. The measuring device 154 is a device capable of measuring distance with high precision in a noncontact manner, and continuously measures the distance from the mounted reference rail 155 to the electrode plate 300. As shown in FIG. 13, the measuring device 154 irradiates a laser light 156 to the electrode plate 300 to measure plural points on coated parts and uncoated parts instantly. The measuring is not limited to the laser light 156 as long as measuring method is non-contact method. Though not illustrated, measurement data is transmitted from the measuring device 154 to a device such as PC then the geometry of the electrode 300 is recognized. The conveyance of the electrode plate 300 during measurement may cause vertical vibration, which has a risk of disturbance on the measurements while conveyance. Therefore, as shown in FIG. 14, the distance to the electrode plate 300 is measured under the condition where vertical vibration is prevented by retaining the electrode plate 300 from the underside with the guide roller 153.

Where the amount of elongation of the uncoated part 301 is smaller than that of the coated part 302, a waving like the one shown in FIG. 11 and FIG. 12 remains on the coated part 302. Therefore, the distance from the reference point to the electrode plate 300 varies as the electrode plate 300 moves to the rear side. It is judged that the variation of the measured distance is large means that a large waving remains and a small variation means that the waving is small. The disappearance of the distance variation of the coated part measured with the measuring device 154 means that the elongation difference between the uncoated part and coated part is eliminated, and thus it can be judged that the electrode plate 300 and the guide roller 153 contact closely over entire width of them.

On the contrary, when the elongation amount of the uncoated part 301 comes larger than that of the coated part, the coated part closely contacts with the guide roller 153. The waving appears on the uncoated part 301a, 301b, and 301c shown in FIG. 2(a) and the measurements with the measuring device 154 located above the uncoated part 301 varies. When the distance measured with the measuring device 154 located above the coated part does not change, but a distance change appears in the measurements obtained with the measuring device 154 located above the uncoated part, the elongation of the uncoated part may be judged too large.

Figure 15:
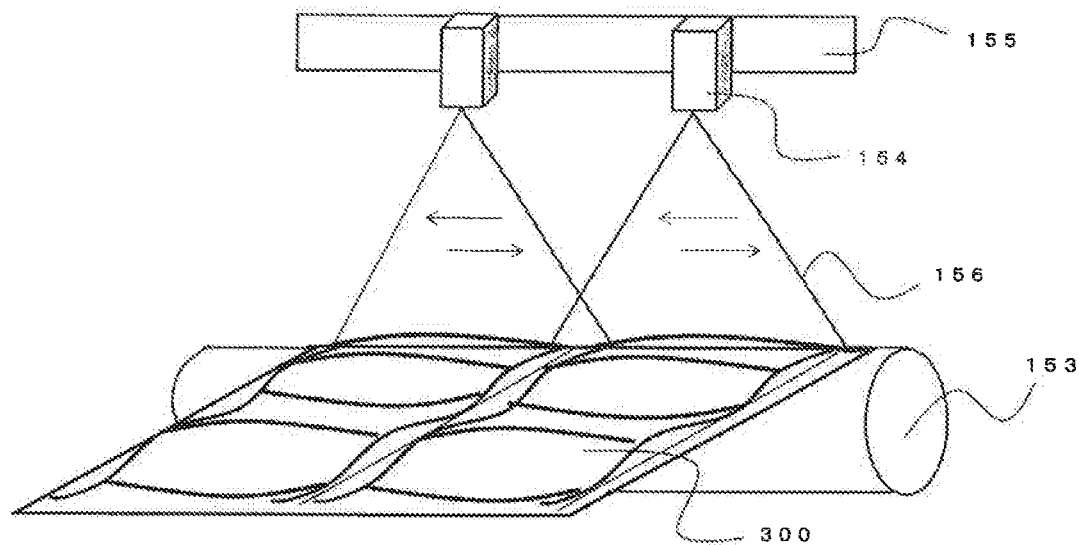
FIG. 15 A schematic view showing a state where the elongation of the coated part is larger than that of the uncoated part.
Figure 16:
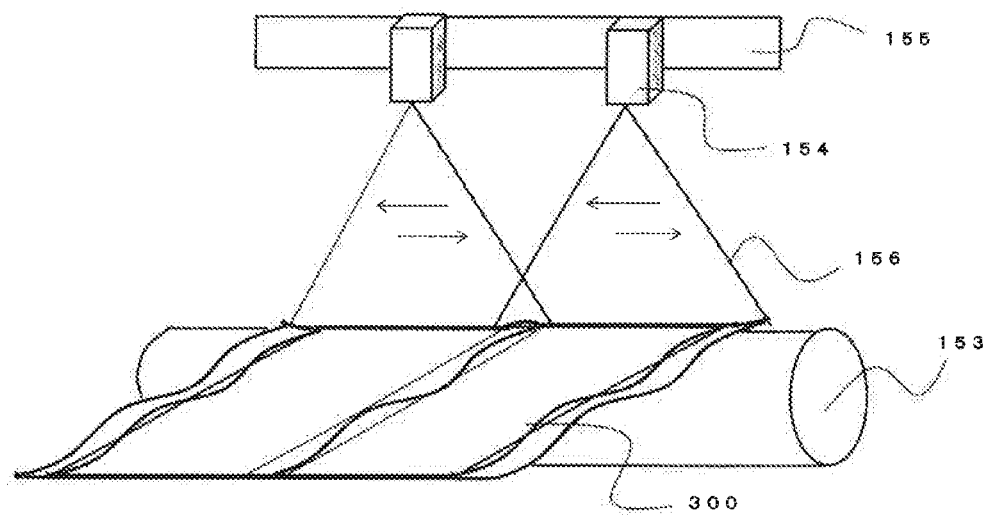
FIG. 16 A schematic view showing a state where the elongation of the uncoated part is larger than that of the coated part.

The first means is a method for measuring the change in the distance from the reference point linearly in the longitudinal direction of the strip-formed electrode plate 300 to judge the elongation difference between the coated part and the uncoated part thereof. Referring to FIG. 15 and FIG. 16, a second means for measuring the geometry of the electrode plate 300 will be described.

As shown in FIG. 15, the distance from the reference point is measured with scanning, not one direction, within a certain range in the axial direction of the guide roller 153 by using a rotating polygon mirror or the like with the measuring device 154. Since the electrode plate 300 moves rearward while being measured, the amount of the convex from the flat state is calculated according to the distance from the reference point measured in a zigzag manner. From the calculation results, an elongation difference between the coated part and the uncoated part on the surface of the electrode plate 300 is judged.

FIG. 15 is a schematic view showing a state where the elongation of the coated part 302 is larger than that of the uncoated part 301.

FIG. 16 is a schematic view showing a state where the elongation of the uncoated part 301 is larger than that of the coated part 302.

In FIG. 15 and FIG. 16, two measuring devices 154 are arranged. However, if one measuring device 154 is capable of scanning the entire width, using one measuring device 154 only is no problem.

When the elongation difference as described above occurs, the pressing force of the work roll 201 which elongates the uncoated part 301 is regulated so that elongation difference between the coated part and the uncoated part will be corrected. The method of regulating the pressing force is various, but the easiest method of regulating is explained. The practical applications are however not limited to this method.

As shown in FIG. 8, the hydraulic pressure of the hydraulic cylinder 206 incorporated in the wrinkling prevention device 200 is controlled by remotely controlling the proportional solenoid pressure reducing valve 217 to make the hydraulic pressure such a pressure that causes no elongation difference between the coated part and the uncoated part. The hydraulic power uses the oil pressure fed from the hydraulic system 218. While changing the pressing force of the hydraulic cylinder 206 by controlling the proportional pressure reducing solenoid valve 217 according to the distance variation measured with the measuring device 154, the pressing force of the work roll 201 is regulated so that the elongation difference between the coated part and the uncoated part will not occur.

{Reference Sign List}

| | |
|---|---|
| 100 | Roll-press apparatus |
| 101 | Upper press-roll |
| 102 | Lower press-roll |
| 103 | Press down device |
| 104 | Bearing box |
| 105 | Housing |
| 151 | Supply uncoiler |
| 152 | Take-up coiler |
| 153 | Guide roller |
| 154 | Measuring device |
| 155 | Reference rai |

{Reference Sign List} -continued

| | |
|---|---|
| 156 | Laser light |
| 200 | Wrinkling prevention device |
| 201 | Work roll |
| 202 | Backup roll |
| 203 | Bearing |
| 204 | Bearing frame |
| 205 | Edge roller |
| 206 | Hydraulic cylinder |
| 207 | Main frame |
| 208 | Sliding rod |
| 209 | Linear motion bearing |
| 210 | Bearing shaft |
| 211 | Rotary shaft |
| 212 | Bearing |
| 213 | Pushing cylinder |
| 215 | Center line |
| 216 | Contact point |
| 217 | Proportional solenoid pressure reducing valve |
| 218 | Hydraulic system |
| 300 | Electrode plate |
| 301 | Metal foil (uncoated part) |
| 302 | Active material (coated part) |

The invention claimed is:

1. A roll-press apparatus, comprising
a pair of upper and lower press-rolls for pressing an electrode plate fed from a supply uncoiler to a take-up coiler,
wherein the electrode plate has a coated part coated with an active material applied on a metal foil and an uncoated part not coated with the active material, and
a wrinkling prevention means,
wherein the wrinkling prevention means comprises:
a work roll having a diameter smaller than a diameter of either of the upper and lower press-rolls, and
a work roll parallelism holding means for keeping the parallelism of the work roll with respect to the corresponding press-roll,
wherein the work roll parallelism holding means comprises:
a frame for holding the work roll, and
a plurality of members provided on the frame, wherein each of which members contacts severally at two points on one of the press-rolls on a side where the work roll does not contact;
wherein the pair of the upper and the lower press-rolls performs roll-pressing the coated part, and
wherein one press-roll in the paired two press-rolls and the work roll perform roll-pressing the uncoated part.

2. The roll-press apparatus according to claim 1,
wherein the frame comprises a shaft bearing frame for supporting the work roll and a main frame for holding the shaft bearing frame, and
wherein each of the members that contacts with the one of the press-rolls at two points is arranged on the shaft bearing frame or the main frame.

3. The roll-press apparatus according to claim 2,
wherein each of the members that severally contacts with the one of the press-rolls at two respective points comprises a roller, which is arranged so that each of the two rollers contacts both ends of the one of the press-rolls respectively.

4. The roll-press apparatus according to claim 3,
wherein the wrinkling prevention device is supported rotatably on a housing via a bearing that holds a rotary shaft, and wherein the roller installed so as to contact both ends of the one of the press-rolls rotates about the rotary shaft.

5. The roll-press apparatus according to claim 2, further comprising
a rotary shaft that engages with a housing of the roll-press apparatus provided on the main frame,
wherein the wrinkling prevention means is arranged in such a way that the roll center of the one of the press-rolls and the work roll and the center of the rotary shaft provided on the main frame are aligned on one straight line.

6. The roll-press apparatus according to claim 5,
wherein the wrinkling prevention means is supported rotatably on the housing via a bearing that holds the rotary shaft,
wherein each of the members that severally contacts with the one of the press-rolls at two respective points comprises a roller, and
wherein the roller is installed so as to contact both ends of the one of the press-rolls and rotate about the rotary shaft.

7. The roll-press apparatus according to claim 2,
wherein the wrinkling prevention device is supported rotatably on a housing via a nearing that holds a rotary shaft,
wherein each of the members that severally contacts with the one of the press-rolls at two respective points comprises a roller, and
wherein the roller is installed so as to contact both ends of the one of the press-rolls and rotates about the rotary shaft.

8. The roll-press apparatus according to claim 1,
wherein the wrinkling prevention means has two backup rolls arranged in a V-formation so as to reinforce the work roll, and
wherein the work roll has a part such that a diameter thereof in contact with the uncoated part is larger than a roll diameter of such a part that contacts the coated part.

9. The roll-press apparatus according to claim 1,
wherein the wrinkling prevention means is supported rotatably on a housing via a bearing that holds a rotary shaft,
wherein each of the members that severally contacts with the one of the press-rolls at two respective points comprises a roller, and
wherein the roller rotates about the rotary shaft.

10. A roll-press apparatus, comprising
a pair of upper and lower press-rolls for pressing an electrode plate fed from a supply uncoiler to a take-up coiler, wherein the electrode plate has a coated part coated with an active material applied on a metal foil and an uncoated part not coated with the active material;
a wrinkling prevention means having a work roll having a diameter smaller than a diameter of either of the upper and lower press-rolls; and
a frame for holding the work roll,
wherein the wrinkling prevention means presses the electrode plate between one of the upper and lower press-rolls and the work roll, and is arranged at the entrance side of the press-roll apparatus to prevent occurrence of wrinkle such that the pair of the upper and the lower press-rolls perform roll-pressing the coated part,
wherein the one of the upper and lower press-rolls and the work roll perform roll-pressing the uncoated part to elongate, and
wherein the uncoated part moves in a state of contacting with the outer periphery of the press-roll, at a speed synchronized with the rotational speed of the press-roll.

* * * * *